Aug. 8, 1933.  W. M. WHITNEY ET AL  1,921,715
WOOD SHAPER
Filed Dec. 5, 1931   3 Sheets-Sheet 1

INVENTOR
William M. Whitney and
BY Alphonzo White
Robt. P. Hains
ATTORNEY

Aug. 8, 1933.  W. M. WHITNEY ET AL  1,921,715
WOOD SHAPER
Filed Dec. 5, 1931  3 Sheets-Sheet 2
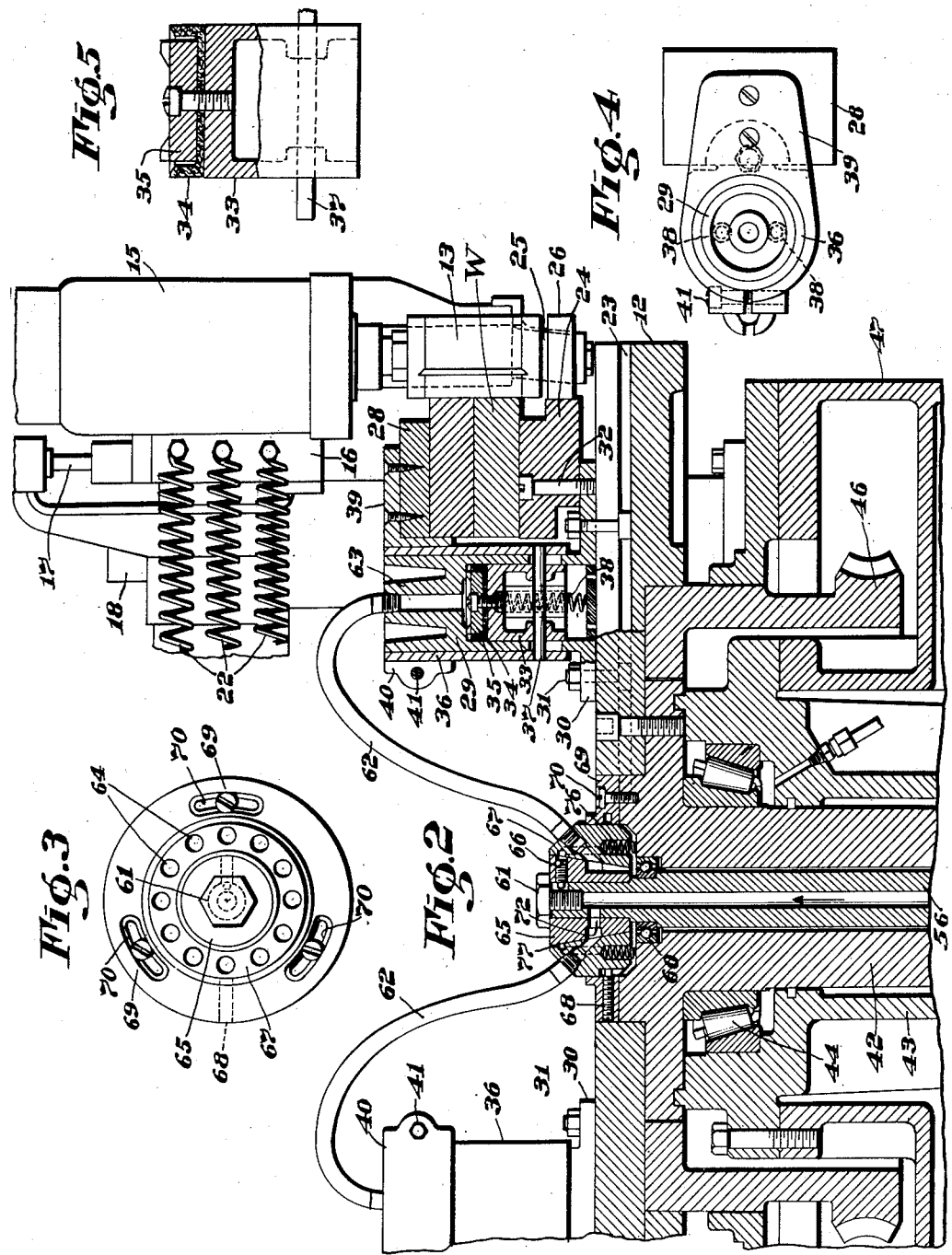
INVENTOR
William M. Whitney and
Alphonzo White
BY Robt P. Havins
ATTORNEY Aug. 8, 1933.  W. M. WHITNEY ET AL  1,921,715
WOOD SHAPER
Filed Dec. 5, 1931  3 Sheets-Sheet 3

INVENTOR
William M. Whitney
BY Alphonzo White
ATTORNEY

Patented Aug. 8, 1933

1,921,715

UNITED STATES PATENT OFFICE 1,921,715

WOOD SHAPER

William M. Whitney and Alphonzo White, Winchendon, Mass., assignors to Baxter D. Whitney & Son, Inc., Winchendon, Mass., a Corporation of Massachusetts Application December 5, 1931. Serial No. 579,206

6 Claims. (Cl. 144—154)

This invention relates to wood shapers and more particularly to clamping mechanism operable automatically to clamp the work before it is acted upon by the cutter and to release the work after the cutting operation is completed.

Wood working machines of the shaper type are extensively used to shape work of irregular contour, and are well adapted for use in cutting out chair arms, for example, and to perform various other cutting operations.

These machines are provided with a movable work support or table adapted to advance the work relative to a rotating cutter, and it is important that clamps or other securing means be provided for firmly holding the work upon the table while it is being acted upon by the cutter. Furthermore, it is highly desirable that the work holding means be so constructed that the work may be quickly secured to the table and removed therefrom to avoid loss of time between successive cutting operations.

The present invention, therefore, contemplates a wood shaper provided with one or more hydraulically controlled clamps for holding the work upon the table during the cutting operation.

One important feature of the present invention resides in valve means controlled by the table movement for actuating the hydraulic clamps and operable automatically to grip the work as it is advanced toward the cutter and to release the work after the cutting operation is completed.

A further feature of the invention resides in a tank associated with the wood shaper to contain the clamp operating liquid, and in means for delivering the liquid from this tank to the clamps under pressure and for returning the liquid exhausted from the clamps to the tank.

Still a further feature of the invention resides in the construction of the valve for automatically controlling the hydraulic clamps and in the construction of these clamps.

Other features of the invention and novel combination of parts in addition to the above will be hereinafter described in connection with the accompanying drawings which illustrate one good practical form of the invention.

In the drawings:—

Fig. 1 is a perspective view of a wood shaper having the hydraulic clamping means of the present invention associated therewith;

Fig. 2 on an enlarged scale is a central sectional view through the upper portion of the shaper of Fig. 1;

Fig. 3 is a top plan view of the liquid controlling valve;

Fig. 4 is a top plan view of one of the hydraulic clamps;

Fig. 5 is a side elevation with parts in section of the piston of one of the hydraulic clamps;

Figure 1:
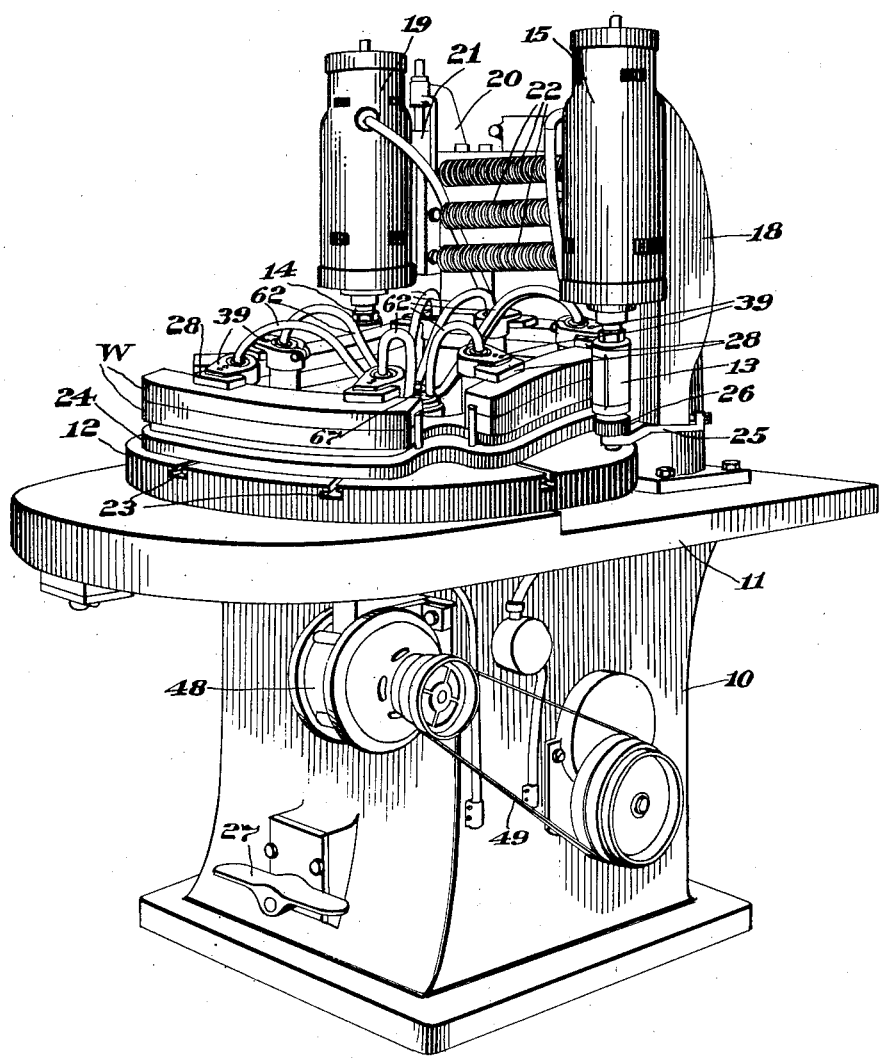
Figure 6:
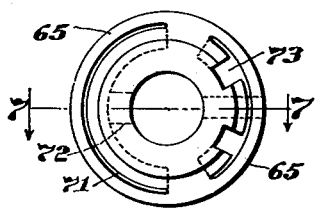
Fig. 6 is a bottom view of the inner fixed member of the valve of Fig. 3.
Figure 7:
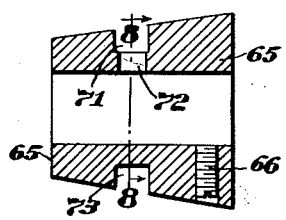
Fig. 7 is a section on line 7—7 of Fig. 6.
Figure 8:
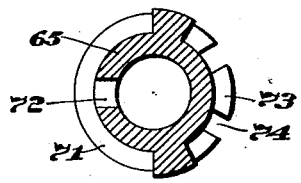
Fig. 8 is a section on line 8—8 of Fig. 7.
Figure 9:
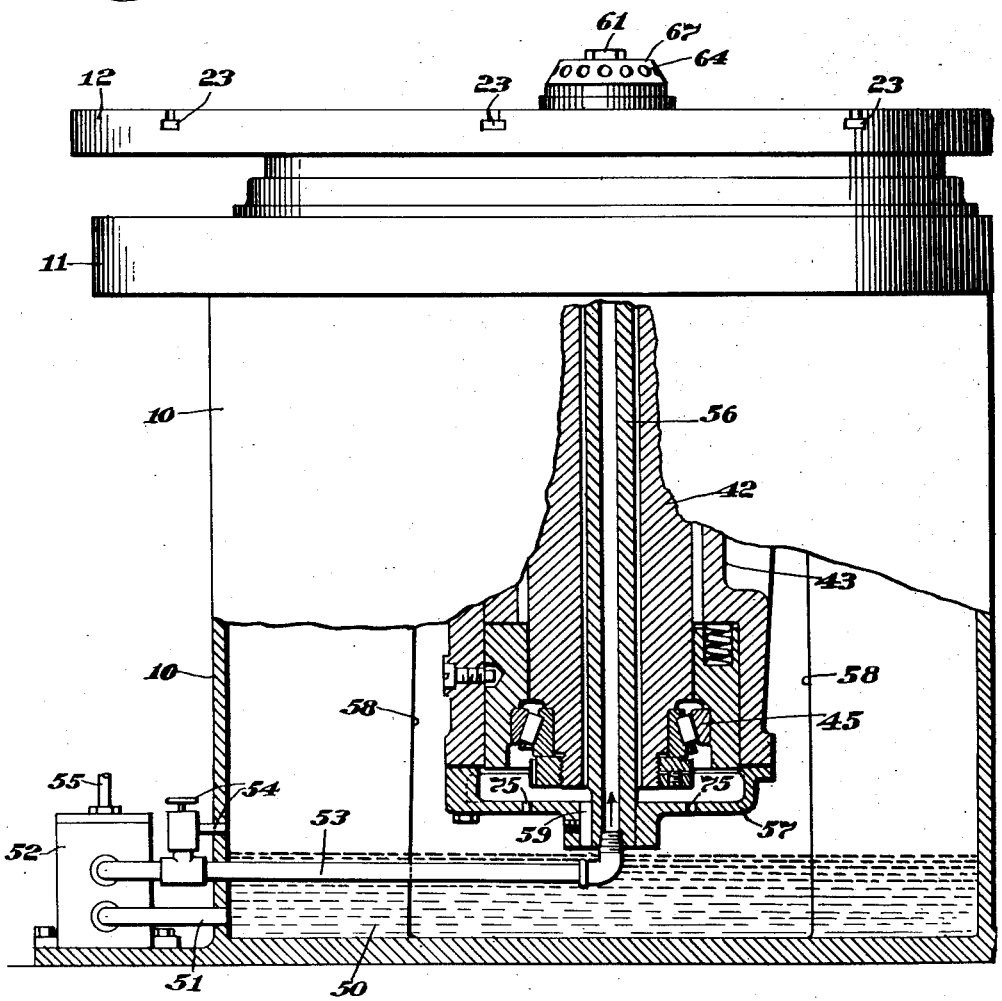
Fig. 9 is a front elevation of Fig. 1 with the lower portion of the machine in section.

The hydraulically operated clamping mechanism of the present invention may be employed in connection with various forms of wood working machines and is shown in the drawings as provided upon a wood shaper, which for the most part is well known in construction and operation.

The wood shaper illustrated is provided with the hollow frame or casing 10 which supports the fixed upper structure or apron 11, and upon this apron is rotatably mounted the table 12 that advances the work relative to the cutters.

The shaper shown is provided with a pair of rotating cutters 13, 14, each mounted for swinging movement toward and from the axis of the rotating table 12. The cutter 13 has the electric driving motor 15 which is supported by the swinging arm 16, and this arm is pivotally secured at 17 to the column 18 extending upwardly from the apron 11. The cutter 14 is driven by the motor 19 that is supported from the column 20 by the swinging arm 21. The motors 15 and 19 are urged towards each other by the springs 22, and the cutters 13 and 14 are usually rotated in opposite directions so that each may cut towards rather than against the grain of the wood.

The revolving table 12 has the usual bolt receiving slots 23 for securing the profile forms 24 to the table, and each of the swinging arms 16 and 21 has secured to its lower end an arm 25 provided with a roller 26 that rests against the profile 24 to position its cutter relative to the work W. The motors 15 and 19 may be started by operating push buttons, and stopped by operating the foot treadle 27.

The parts so far described form no essential part of the present invention but have been illustrated and briefly described to make clear the association therewith of the present invention which will now be described.

In the embodiment of the invention illustrated the rotating table 12 is provided with a number of hydraulic work clamps, each of which has a movable upper jaw 28 adapted to hold one or more pieces of work W firmly against the profile form 24.

Each of these hydraulic clamps is shown as comprising a hollow post or casing 29 which is provided at its lower end with a base 30 adapted to be secured by bolts 31 to the table 12, and the profile form 24 may be secured to the base 30 by the bolts 32. Within the hollow post 29 is slidably mounted the piston 33 having the packing material 34 secured at its upper end by the disk 35.

Slidably mounted upon the outer surface of the fixed post 29 is the tubular column 36 and this column is rigidly secured to the piston 33 by the transversely extending pin 37, which extends through elongated slots in the fixed post 29. The piston 33 is continuously urged upwardly by the compressed springs 38 confined between the base of the post and the under face of the hollow piston. The upper jaw 28 is secured to the laterally extending portion 39 of a split sleeve 40 that is adjustably secured by a bolt 41 to the tubular column 36, the arrangement being such that the sleeve 40 may be adjusted vertically upon the column 36 to vary the distance between the clamping jaws.

The table 12 is shown as mounted upon the revolving hollow post 42 which is rotatably supported within the fixed hollow column 43 by the upper antifriction bearing 44 and lower antifriction bearing 45. The table supporting post 42 has rigidly secured thereto the worm gear 46 enclosed in the housing 47 and adapted to be driven by a worm, not shown, by the motor 48 and belt 49.

In accordance with one feature of the present invention the lower portion of the hollow casing 10 is constructed to form a tank 50 for the hydraulic operating liquid such as oil. This liquid may be delivered by the pipe 51 to a pump 52 secured to the casing 10, to be supplied by the pump to the pipe 53 under pressure. An adjustable valve 54 is preferably provided to control the pressure of the oil and is provided with a pipe for returning the excess oil to the tank. The pump 52 may be driven by an electric motor, not shown, but attached to the shaft 55.

The pipe 53 in the construction shown, is connected to the upright pipe 56 which is non-rotatably supported at the centre of the machine by the lower plate 57 that is secured to the lower end of the hollow column 43. This column is supported above the tank 50 by the ribs 58 of the casing 10, and the lower end of the pipe 56 is keyed to the plate 57, as at 59.

The upright pipe is provided near its upper end with the bearing 60 that centers this pipe within the rotating post 42, and the upper end of the pipe is closed by the bolt 61. The pipe 56 serves to supply oil under pressure to each of the hydraulic clamps, eight of these clamps being shown in Fig. 1, each of which is provided with a flexible pipe 62 that leads from the central conduit 63 of the clamp post 29 to a port 64 of the central distributing valve to be described.

This distributing valve in the construction shown comprises an inner conical member 65 that is rigidly secured by a bolt 66 to the upper end of the pipe 56. The conical member 65 fits snugly in the outer valve casing 67 that is secured by a bolt 68 in a central opening within a ring 69 mounted at the centre of the revolving table 12. It may be desirable to adjust the valve casing 67 angularly with respect to the table 12 to vary the timing of the closing and opening of the hydraulic clamps. The ring 69 is therefore adjustably secured to the post 42 by bolts within the slots 70.

The construction of the distributing valve is such that each clamp will be held closed while at the rearward portion of the machine to clamp the work that is in the vicinity of the cutters 13 and 14, but will be held open while at the front of the machine to permit the removal of the finished work and insertion of new work.

This is accomplished by providing the inner valve member with the arcuate port 71 that communicates with the pipe 56 through the aligned ports 72 and by providing the opposite side of the inner valve member with the arcuate port 73 having the passages 74 for discharging the exhaust oil from the clamps downwardly into the clearance space below the outer valve member 67, so that it may pass downwardly through the bearing 60 and in the clearance passage around the pipe 56 to the lower plate 57 to escape through the openings 75 into the tank 50.

As a result of the valve construction just described the clamps at the rear portion of the machine will be held closed as long as their flexible pipes are in communication with the arcuate port 71, and the clamps at the front of the machine will be held open by the springs 38 as long as their flexible pipes are in communication with the arcuate port 73. The extra distributing ports 64 which are not provided with flexible pipes are closed with plugs, not shown.

A tight joint between the bearing surfaces of the fixed valve member 65 and rotating valve member 67 is maintained in the construction shown by the compressed springs 76 and any oil that may escape upwardly between these bearing surfaces will enter the annular passage 77 to pass downwardly through a port leading therefrom to the clearance space below the member 67.

It will be understood from the foregoing that as the work supporting table 12 rotates the hydraulic clamps will open automatically as they approach the front of the machine to permit the work to be changed and will close automatically to hold the work while in the vicinity of the cutters. The oil is delivered from the tank 50 to the hydraulic clamps by the pump 52 and pipe connections described, and is forced into the chamber within the fixed post 29 of a clamp above the piston 33. This moves the piston 33 and parts attached thereto downwardly to force the jaw 28 downwardly against the work. The exhausted oil is returned to the tank 50 through the bearing 60, which it lubricates, and the passage surrounding the pipe 56.

What is claimed is:—

1. A wood shaper comprising in combination, a revolving work support, a cutter, a hydraulic work clamp upon the work support, a tank for the clamp operating liquid, means for supplying the liquid to the clamp under pressure and for returning it to said tank, including a pipe mounted at the axis of the revolving work support to supply liquid to the clamp and arranged to provide a return passage for the liquid surrounding the pipe, and a valve controlled by the rotation of the work support for opening and closing the clamp.

2. A woodworking machine comprising in combination, a main frame, a work supporting table rotatably mounted thereupon, a cutter, a hydraulic work clamp mounted upon the table, a tank for the clamp operating liquid, means for supplying the liquid to the clamp under pressure and for returning it to the tank including a fixed pipe mounted at the axis of the revolving table for supplying the liquid to the clamp and arranged to provide a return passage for the liquid surrounding the pipe, and a valve controlled by the movement of the table for opening and closing the clamp.

3. A wood shaper comprising in combination, a revolving work support, a fixed pipe about which the work support rotates and provided with a liquid return passage surrounding the pipe, a cutter, a hydraulic work clamp mounted upon said support, a tank for the clamp operating liquid, means for forcing the operating liquid from said tank through said pipe under pressure, and means for delivering the liquid from said pipe to the clamp under pressure and for returning it through said passage to the tank, including a valve controlled by the movement of the work support to open and close the clamp.

4. A wood shaper comprising in combination, a revolving work support, a vertical pipe about which the work support rotates and provided with a liquid return passage surrounding the pipe, a cutter, a hydraulic work clamp upon said support, a tank for the clamp operating liquid adapted to catch the liquid flowing downwardly in said passage, means for delivering the liquid from the tank to said pipe under pressure, and means including a valve for delivering liquid under pressure from said pipe to the clamp and for delivering the liquid exhausted from the clamp to said return passage.

5. A wood shaper comprising in combination, a main casing having its base constructed to form a liquid tank, a revolving work support rotatably mounted upon the casing, a cutter, a hydraulic work clamp upon said support, means for delivering the liquid from said tank to the clamp under pressure and for directing the liquid exhausted from the clamp downwardly into said tank, including a feed pipe mounted at the central axis of the revolving work support and arranged to provide a liquid return passage surrounding the pipe, and a valve for controlling said liquid to open and close the clamp.

6. A wood shaper comprising in combination, a movable work support, a cutter, a hydraulic work clamp mounted on said support and comprising a hollow casing having a piston slidably mounted therein and a jaw disposed at one side of the piston and provided with means for rigidly securing it to the piston in different positions of adjustment, a tank for the clamp operating liquid, and means for supplying the liquid to the clamp under pressure and for returning it to the tank, including a valve controlled by the movement of the work support for opening and closing the clamp and means for returning the liquid from the moving work support to the tank.

WILLIAM M. WHITNEY.
ALPHONZO WHITE.